(12) United States Patent
Jungreis et al.

(10) Patent No.: US 8,767,418 B2
(45) Date of Patent: Jul. 1, 2014

(54) CONTROL SYSTEM FOR A POWER CONVERTER AND METHOD OF OPERATING THE SAME

(75) Inventors: Aaron Jungreis, Richardson, TX (US); Antony Brinlee, Plano, TX (US); Paul Garrity, Rockwall, TX (US)

(73) Assignee: Power Systems Technologies Ltd., Ebene (MU)

( * ) Notice: Subject to any disclaimer, the term of this patent is extended or adjusted under 35 U.S.C. 154(b) by 185 days.

(21) Appl. No.: 13/050,494

(22) Filed: Mar. 17, 2011

(65) Prior Publication Data

US 2011/0305047 A1 Dec. 15, 2011

Related U.S. Application Data

(60) Provisional application No. 61/314,900, filed on Mar. 17, 2010.

(51) Int. Cl.
*G05F 1/00* (2006.01)
*H02M 3/335* (2006.01)

(52) U.S. Cl.
USPC ............. 363/21.15; 323/238; 363/21.07

(58) Field of Classification Search
USPC .................. 363/21.07, 21.15; 323/238
See application file for complete search history.

(56) References Cited

U.S. PATENT DOCUMENTS

| | | | |
|---|---|---|---|
| 1,376,978 A | 5/1921 | Stoekle | |
| 2,473,662 A | 6/1949 | Pohm | |
| 3,007,060 A | 10/1961 | Guenther | |
| 3,346,798 A | 10/1967 | Dinger | |
| 3,358,210 A | 12/1967 | Grossoehme | |
| 3,433,998 A | 3/1969 | Woelber | |
| 3,484,562 A | 12/1969 | Kronfeld | |
| 3,553,620 A | 1/1971 | Cielo et al. | |
| 3,622,868 A | 11/1971 | Todt | |

(Continued)

FOREIGN PATENT DOCUMENTS

| CN | 101141099 | 3/2008 |
|---|---|---|
| CN | 101202509 | 6/2008 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

*Primary Examiner* — Adolf Berhane
*Assistant Examiner* — Gary Nash
(74) *Attorney, Agent, or Firm* — Boisbrun Hofman, PLLC

(57) ABSTRACT

A power converter employing a control system configured to make multiple functional use of a circuit node therein and method of operating the same. In one embodiment, the power converter includes a power train including at least one power switch. The power converter also includes a control system including an opto-isolator circuit, including a resistor, configured to receive an output signal from the power converter and provide a feedback signal to a feedback node for the control system to provide a switch control signal for the at least one power switch. The control system also includes a current source configured to produce multiple voltage levels at the feedback node in accordance with the resistor, thereby enabling multiple functional uses of the feedback node.

20 Claims, 5 Drawing Sheets

(56) References Cited

U.S. PATENT DOCUMENTS

| | | |
|---|---|---|
| 3,681,679 A | 8/1972 | Chung |
| 3,708,742 A | 1/1973 | Gunn |
| 3,708,744 A | 1/1973 | Stephens et al. |
| 4,011,498 A * | 3/1977 | Hamstra ................ 323/238 |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,672,245 A | 6/1987 | Majumdar et al. |
| 4,770,667 A | 9/1988 | Evans |
| 4,770,668 A | 9/1988 | Skoultchi et al. |
| 4,780,653 A | 10/1988 | Bezos et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Silva et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balaakrishnan |
| 5,027,264 A | 6/1991 | DeDoncker et al. |
| 5,055,991 A | 10/1991 | Carroll et al. |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,453,923 A | 9/1995 | Scalais et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,661,642 A | 8/1997 | Shimashita |
| 5,663,876 A | 9/1997 | Newton et al. |
| 5,671,131 A | 9/1997 | Brown |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,386 A | 9/1998 | Gordon |
| 5,864,110 A | 1/1999 | Moriguchi et al. |
| 5,870,299 A | 2/1999 | Rozman |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,982,640 A | 11/1999 | Naveed et al. |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,212,084 B1 | 4/2001 | Turner |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumuar |
| 6,320,490 B1 | 11/2001 | Clayton |
| 6,323,090 B1 | 11/2001 | Zommer |
| 6,325,035 B1 | 12/2001 | Codina et al. |

(56) References Cited

U.S. PATENT DOCUMENTS

| | | |
|---|---|---|
| 6,344,986 B1 | 2/2002 | Jain et al. |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 * | 5/2002 | Ng et al. ............... 363/21.07 |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,559,689 B1 | 5/2003 | Clark |
| 6,563,725 B2 | 5/2003 | Carsten |
| 6,570,268 B1 | 5/2003 | Perry et al. |
| 6,580,627 B2 | 6/2003 | Toshino |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumuar |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,839,247 B1 * | 1/2005 | Yang et al. ............... 363/21.11 |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmerman |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,200,016 B2 * | 4/2007 | Ogawa ............... 363/56.01 |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,393,247 B1 | 7/2008 | Yu et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,453,709 B2 * | 11/2008 | Park et al. ............... 363/21.15 |
| 7,462,891 B2 | 12/2008 | Brar et al. |
| 7,468,649 B2 | 12/2008 | Chandrasekaran |
| 7,489,225 B2 | 2/2009 | Dadafshar |
| 7,554,430 B2 | 6/2009 | Mehrotra et al. |
| 7,558,037 B1 * | 7/2009 | Gong et al. ............... 361/93.1 |
| 7,567,445 B2 | 7/2009 | Coulson et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang |
| 7,791,903 B2 | 9/2010 | Zhang |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,125,205 B2 | 2/2012 | Chandrasekaran et al. |
| 8,134,443 B2 | 3/2012 | Chandrasekaran et al. |
| 8,179,699 B2 | 5/2012 | Tumminaro et al. |
| 8,278,889 B2 | 10/2012 | Tataeishi |
| 8,638,578 B2 | 1/2014 | Zhang |
| 8,643,222 B2 | 2/2014 | Brinlee et al. |
| 2001/0020886 A1 | 9/2001 | Matsumoto et al. |
| 2001/0024373 A1 | 9/2001 | Cuk |
| 2001/0055216 A1 * | 12/2001 | Shirato ............... 363/21.07 |

(56) References Cited

U.S. PATENT DOCUMENTS

| | | | |
|---|---|---|---|
| 2002/0044463 A1* | 4/2002 | Bontempo et al. | 363/21.07 |
| 2002/0057080 A1 | 5/2002 | Telefus et al. | |
| 2002/0071295 A1* | 6/2002 | Nishikawa | 363/21.15 |
| 2002/0101741 A1 | 8/2002 | Brkovic | |
| 2002/0110005 A1 | 8/2002 | Mao et al. | |
| 2002/0114172 A1 | 8/2002 | Webb et al. | |
| 2002/0145888 A1* | 10/2002 | Yoshinaga et al. | 363/21.15 |
| 2002/0167385 A1 | 11/2002 | Ackermann | |
| 2002/0176262 A1* | 11/2002 | Tripathi et al. | 363/21.15 |
| 2003/0026115 A1 | 2/2003 | Miyazaki | |
| 2003/0030422 A1 | 2/2003 | Sula | |
| 2003/0063483 A1 | 4/2003 | Carsten | |
| 2003/0063484 A1 | 4/2003 | Carsten | |
| 2003/0076079 A1 | 4/2003 | Alcantar et al. | |
| 2003/0086279 A1 | 5/2003 | Bourdillon | |
| 2003/0197585 A1 | 10/2003 | Chandrasekaran et al. | |
| 2003/0198067 A1 | 10/2003 | Sun et al. | |
| 2004/0017689 A1 | 1/2004 | Zhang et al. | |
| 2004/0032754 A1 | 2/2004 | Yang | |
| 2004/0034555 A1 | 2/2004 | Dismukes et al. | |
| 2004/0064621 A1 | 4/2004 | Dougherty | |
| 2004/0148047 A1 | 7/2004 | Dismukes et al. | |
| 2004/0156220 A1 | 8/2004 | Kim et al. | |
| 2004/0196672 A1 | 10/2004 | Amei | |
| 2004/0200631 A1 | 10/2004 | Chen | |
| 2004/0217794 A1 | 11/2004 | Strysko | |
| 2004/0257095 A1 | 12/2004 | Yang | |
| 2005/0024179 A1 | 2/2005 | Chandrasekaran et al. | |
| 2005/0046404 A1 | 3/2005 | Uusitalo | |
| 2005/0052224 A1 | 3/2005 | Yang et al. | |
| 2005/0052886 A1 | 3/2005 | Yang | |
| 2005/0207189 A1* | 9/2005 | Chen | 363/21.15 |
| 2005/0245658 A1 | 11/2005 | Mehrotra et al. | |
| 2005/0254266 A1 | 11/2005 | Jitaru | |
| 2005/0254268 A1 | 11/2005 | Reinhard | |
| 2005/0281058 A1 | 12/2005 | Batarseh et al. | |
| 2005/0286270 A1 | 12/2005 | Petkov et al. | |
| 2006/0006975 A1 | 1/2006 | Jitaru et al. | |
| 2006/0006976 A1 | 1/2006 | Bruno | |
| 2006/0007713 A1 | 1/2006 | Brown | |
| 2006/0018136 A1* | 1/2006 | Takahashi | 363/21.15 |
| 2006/0038549 A1 | 2/2006 | Mehrotra et al. | |
| 2006/0038649 A1 | 2/2006 | Mehrotra et al. | |
| 2006/0038650 A1 | 2/2006 | Mehrotra et al. | |
| 2006/0044845 A1* | 3/2006 | Fahlenkamp et al. | 363/21.15 |
| 2006/0091430 A1 | 5/2006 | Sriram et al. | |
| 2006/0109698 A1 | 5/2006 | Qu | |
| 2006/0187684 A1 | 8/2006 | Chandrasekaran et al. | |
| 2006/0197510 A1 | 9/2006 | Chandrasekaran | |
| 2006/0198173 A1 | 9/2006 | Rozman | |
| 2006/0226477 A1 | 10/2006 | Brar et al. | |
| 2006/0226478 A1 | 10/2006 | Brar et al. | |
| 2006/0227576 A1 | 10/2006 | Yasumura | |
| 2006/0237968 A1 | 10/2006 | Chandrasekaran | |
| 2006/0255360 A1 | 11/2006 | Brar et al. | |
| 2006/0271315 A1 | 11/2006 | Cargonja et al. | |
| 2007/0007945 A1 | 1/2007 | King et al. | |
| 2007/0010298 A1 | 1/2007 | Chang | |
| 2007/0019356 A1 | 1/2007 | Morikawa | |
| 2007/0025124 A1 | 2/2007 | Hansson | |
| 2007/0030717 A1 | 2/2007 | Luger et al. | |
| 2007/0041224 A1 | 2/2007 | Moyse et al. | |
| 2007/0045765 A1 | 3/2007 | Brar et al. | |
| 2007/0058402 A1 | 3/2007 | Shekhawat et al. | |
| 2007/0069286 A1 | 3/2007 | Brar et al. | |
| 2007/0114979 A1 | 5/2007 | Chandrasekaran | |
| 2007/0120953 A1 | 5/2007 | Koga et al. | |
| 2007/0121351 A1 | 5/2007 | Zhang et al. | |
| 2007/0159857 A1 | 7/2007 | Lee | |
| 2007/0206523 A1 | 9/2007 | Huynh et al. | |
| 2007/0222463 A1 | 9/2007 | Qahouq et al. | |
| 2007/0241721 A1 | 10/2007 | Weinstein et al. | |
| 2007/0274106 A1 | 11/2007 | Coulson et al. | |
| 2007/0274107 A1 | 11/2007 | Garner et al. | |
| 2007/0296028 A1 | 12/2007 | Brar et al. | |
| 2007/0296383 A1 | 12/2007 | Xu | |
| 2007/0298559 A1 | 12/2007 | Brar et al. | |
| 2007/0298564 A1 | 12/2007 | Brar et al. | |
| 2008/0012423 A1 | 1/2008 | Mimran | |
| 2008/0024094 A1 | 1/2008 | Nishihara et al. | |
| 2008/0024259 A1 | 1/2008 | Chandrasekaran et al. | |
| 2008/0031021 A1 | 2/2008 | Ros et al. | |
| 2008/0037294 A1 | 2/2008 | Indika de Silva et al. | |
| 2008/0043503 A1 | 2/2008 | Yang | |
| 2008/0054874 A1 | 3/2008 | Chandrasekaran et al. | |
| 2008/0080219 A1 | 4/2008 | Sohma | |
| 2008/0111657 A1 | 5/2008 | Mehrotra et al. | |
| 2008/0130321 A1 | 6/2008 | Artusi et al. | |
| 2008/0130322 A1 | 6/2008 | Artusi et al. | |
| 2008/0137381 A1 | 6/2008 | Beasley | |
| 2008/0150666 A1 | 6/2008 | Chandrasekaran et al. | |
| 2008/0175026 A1 | 7/2008 | Yang | |
| 2008/0205104 A1 | 8/2008 | Lev et al. | |
| 2008/0224812 A1 | 9/2008 | Chandrasekaran | |
| 2008/0232141 A1 | 9/2008 | Artusi et al. | |
| 2008/0298106 A1 | 12/2008 | Tateishi | |
| 2008/0310190 A1 | 12/2008 | Chandrasekaran et al. | |
| 2008/0315852 A1 | 12/2008 | Jayaraman et al. | |
| 2008/0316779 A1 | 12/2008 | Jayaraman et al. | |
| 2009/0002054 A1 | 1/2009 | Tsunoda et al. | |
| 2009/0027926 A1 | 1/2009 | Yang et al. | |
| 2009/0046486 A1 | 2/2009 | Lu et al. | |
| 2009/0097290 A1 | 4/2009 | Chandrasekaran | |
| 2009/0109711 A1 | 4/2009 | Hsu | |
| 2009/0257250 A1 | 10/2009 | Liu | |
| 2009/0273957 A1 | 11/2009 | Feldtkeller | |
| 2009/0284994 A1 | 11/2009 | Lin et al. | |
| 2009/0289557 A1 | 11/2009 | Itoh et al. | |
| 2009/0310388 A1 | 12/2009 | Yang | |
| 2009/0315530 A1 | 12/2009 | Baranwal | |
| 2010/0091522 A1 | 4/2010 | Chandrasekaran et al. | |
| 2010/0123486 A1 | 5/2010 | Berghegger | |
| 2010/0149838 A1 | 6/2010 | Artusi et al. | |
| 2010/0164443 A1 | 7/2010 | Tumminaro et al. | |
| 2010/0182806 A1 | 7/2010 | Garrity et al. | |
| 2010/0188876 A1 | 7/2010 | Garrity et al. | |
| 2010/0202165 A1 | 8/2010 | Zheng et al. | |
| 2010/0213989 A1 | 8/2010 | Nakatake | |
| 2010/0254168 A1 | 10/2010 | Chandrasekaran | |
| 2010/0321958 A1 | 12/2010 | Brinlee et al. | |
| 2010/0321964 A1 | 12/2010 | Brinlee et al. | |
| 2011/0038179 A1 | 2/2011 | Zhang | |
| 2011/0089917 A1 | 4/2011 | Chen et al. | |
| 2011/0134664 A1 | 6/2011 | Berghegger | |
| 2011/0149607 A1 | 6/2011 | Jungreis et al. | |
| 2011/0182089 A1 | 7/2011 | Berghegger | |
| 2011/0239008 A1 | 9/2011 | Lam et al. | |
| 2011/0241738 A1 | 10/2011 | Tamaoka | |
| 2011/0305047 A1 | 12/2011 | Jungreis et al. | |
| 2012/0243271 A1 | 9/2012 | Berghegger | |
| 2012/0294048 A1 | 11/2012 | Brinlee | |

FOREIGN PATENT DOCUMENTS

| | | |
|---|---|---|
| CN | 201252294 | 6/2009 |
| DE | 10310361 | 9/2004 |
| EP | 0 665 634 A1 | 1/1994 |
| JP | 57097361 | 6/1982 |
| JP | 3-215911 | 9/1991 |
| JP | 2000-68132 | 3/2000 |
| WO | 8700991 | 2/1987 |
| WO | WO 2010/083511 A1 | 7/2010 |
| WO | WO 2010/083514 A1 | 7/2010 |
| WO | WO 2010/114914 A1 | 10/2010 |
| WO | 2011116225 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

(56) References Cited

OTHER PUBLICATIONS

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Chen, W. et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.
Chhawcharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC-DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Maxim, Application Note 725, www.maxim-ic.com/an725, Maxim Integrated Products, Inc., Nov. 29, 2001, 8 pages.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
National Semiconductor Corporation, "LMC7660 Switched Capacitor Voltage Converter," www.national.com, Apr. 1997, 12 pages.
National Semiconductor Corporation, "LM2665 Switched Capacitor Voltage Converter," www.national.com, Sep. 2005, 9 pages.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.
Texas Instruments Incorporated, "LT1054, LT1054Y Switched-Capacitor Voltage Converters With Regulators," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparison of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Modern GaAs Processing Methods," 1990, pp. 66-67, Artech House, Inc., Norwood, MA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.
Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

(56) References Cited

OTHER PUBLICATIONS

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L, et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L, et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Power Integrations, Inc., "TOP200-4/14 *TOPSwitch*® Family Three-terminal Off-line PWM Switch," Internet Citation, http://www.datasheet4u.com/.download.php?id=311769, Jul. 1996, XP002524650, pp. 1-16.

Bill Andreycak, Active Clamp and Reset Technique Enhances Forward Converter Performance, Oct. 1994, Texas Instruments, 19 pages.

Ridley, R., Designing with the TL431, Switching Power Magazine, Designer Series XV, pp. 1-5, 2005.

\* cited by examiner

US 8,767,418 B2

CONTROL SYSTEM FOR A POWER CONVERTER AND METHOD OF OPERATING THE SAME

This application claims the benefit of U.S. Provisional Application No. 61/314,900, entitled "Controller for a Power Converter and Method of Operating the Same," filed on Mar. 17, 2010, which application is incorporated herein by reference.

TECHNICAL FIELD

The present invention is directed, in general, to power electronics and, more specifically, to a power converter employing a control system configured to make multiple operational use of a circuit node therein and method of operating the same.

BACKGROUND

A switched-mode power converter (also referred to as a "power converter" or "regulator") is a power supply or power processing circuit that converts an input voltage waveform into a specified output voltage waveform. Dc-dc power converters convert a direct current ("dc") input voltage into a dc output voltage. Controllers associated with the power converters manage an operation thereof by controlling conduction periods of power switches employed therein. Some power converters include a controller coupled between an input and output of the power converter in a feedback loop configuration (also referred to as a "control loop" or "closed control loop") to regulate an output signal or characteristic of the power converter. Typically, the controller measures the output characteristic (e.g., an output voltage, an output current, or a combination of an output voltage and an output current) of the power converter, and based thereon modifies a duty cycle which can be an ON time or a switching frequency of a power switch of the power converter to regulate the output characteristic. Other power converters operate in an open-loop manner wherein an output voltage is produced substantially proportional to an input voltage.

The number of physical input pins on integrated circuits ("ICs") such as mixed-signal integrated circuits that embody a controller for a power converter typically sense a single analog voltage level entering the integrated circuit, and are limited to adjustment of only one internal signal level by that analog voltage level through external components. Occasionally, there is also a logic function associated with these input pins as well, but only a single voltage level sense. Thus, additional pins are conventionally added to an integrated circuit to provide additional voltage inputs for an internal signal that is utilized by the controller. However, the additional integrated circuit pins are expensive, especially when exceeding a typical package limit (e.g., changing from 16 to 17 or more pins). It is highly advantageous from a manufacturing cost perspective to maintain a standardized pin arrangement.

Accordingly, what is needed in the art is a design approach and related method for a control system for a power converter that enables multiple functional use of an integrated circuit input pin without compromising product performance, and that can be advantageously adapted to high-volume manufacturing techniques without adding significant cost. A further need in the art is elimination of an opto-isolator by sharing an opto-isolator (e.g., a feedback opto-isolator) with another opto-isolator (e.g., a fault opto-isolator) in the power converter.

SUMMARY OF THE INVENTION

These and other problems are generally solved or circumvented, and technical advantages are generally achieved, by advantageous embodiments of the present invention, including a power converter employing a control system configured to make multiple functional use of a circuit node therein and method of operating the same. In one embodiment, the power converter includes a power train including at least one power switch. The power converter also includes a control system including an opto-isolator circuit, including a resistor, configured to receive an output signal from the power converter and provide a feedback signal to a feedback node for the control system to provide a switch control signal for the at least one power switch. The control system also includes a current source configured to produce multiple voltage levels at the feedback node in accordance with the resistor, thereby enabling multiple functional uses of the feedback node.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter employing a control system configured to provide multiple functional use of a circuit node (e.g., a pin such as a pin of an integrated circuit), or to eliminate a need for an added opto-isolator for fault reporting or other purposes. While the principles of the present invention will be described in the environment of a power converter, any application that may benefit from a control system as described herein including, without limitation, a bias supply, a power amplifier, or a motor controller is well within the broad scope of the present invention.

A resonant full-bridge or half-bridge power converter or other resonant power converter topology with a substantially symmetric input current waveform may be employed in low and medium power applications such as in a power adapter for a printer because of its low cost and high power conversion efficiency at power levels of interest for these applications. Power converters are typically designed to operate continuously at their full rated output power level.

Figure 1:
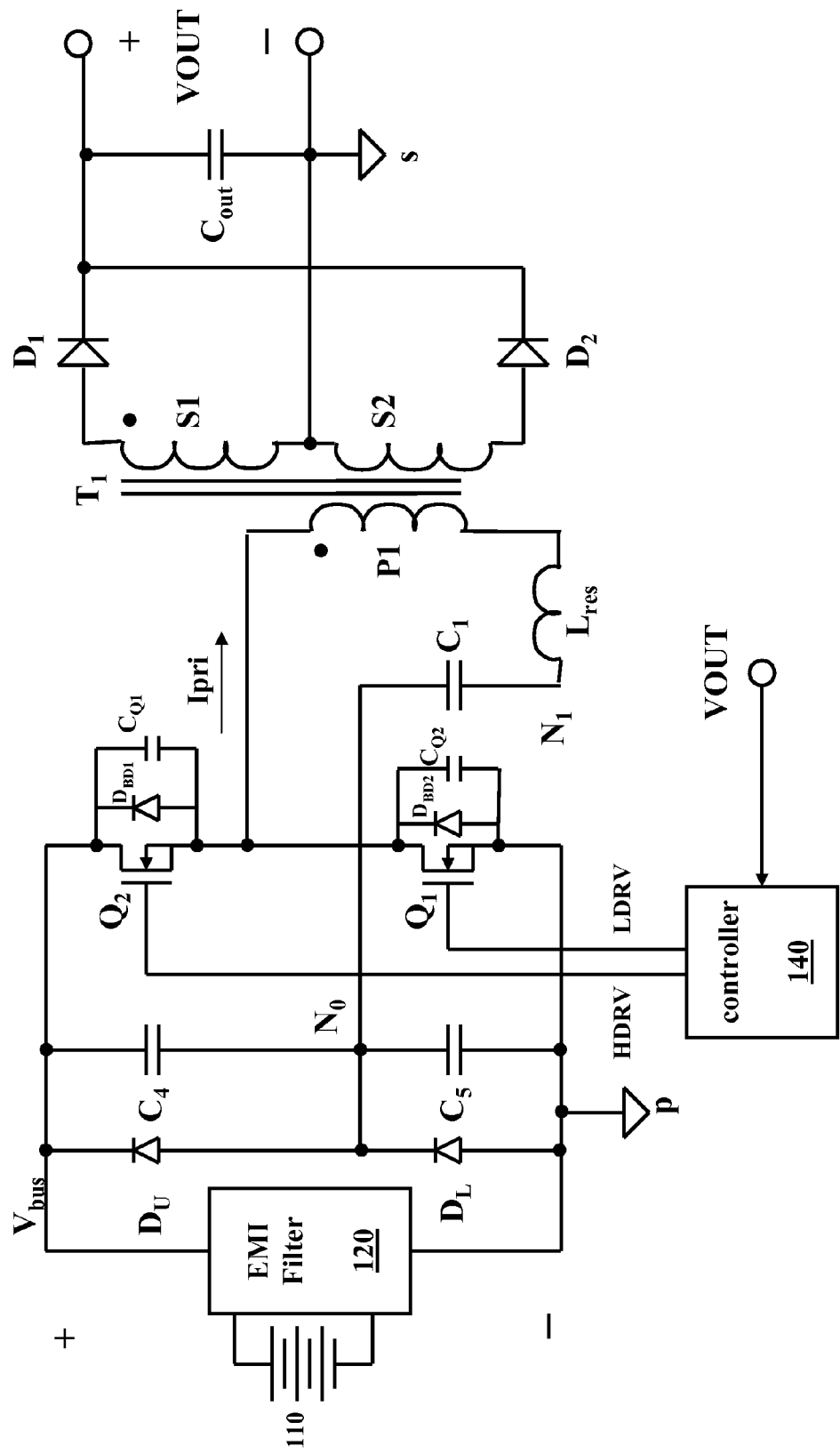
FIG. 1 illustrates a schematic diagram of an embodiment of a power converter constructed according to the principles of the present invention.

Turning now to FIG. 1, illustrated is a schematic diagram of an embodiment of a power converter (e.g., a resonant half-bridge dc-dc power converter) constructed according to the principles of the present invention. The power converter illustrated in FIG. 1 can be operated as a variable-frequency inductor-inductor-capacitor ("LLC") resonant power stage or as a zero-voltage switched quasi-resonant power stage, and is similar to the power converter described in U.S. patent application Ser. No. 12/642,448, entitled "Controller for a Power Converter," to Jungreis, et al., filed Dec. 18, 2009, which is incorporated herein by reference.

The power converter includes first and second power switches $Q_1$, $Q_2$ in series with a dc bus (at an input of the power converter) produced by a dc input voltage source 110, represented in FIG. 1 by a battery, and filtered by an electromagnetic interference ("EMI") filter 120. First and second switch capacitors $C_{Q1}$, $C_{Q2}$ represent capacitances of the first and second power switches $Q_1$, $Q_2$, respectively, or alternatively, discrete capacitors optionally included in the power converter to retard voltage changes across the first and second power switches $Q_1$, $Q_2$. The EMI filter 120 provides a substantially filtered dc bus voltage or input voltage $V_{bus}$ to a magnetic device (e.g., an isolating transformer or transformer $T_1$). Typically, the dc input voltage source 110 would be produced by a bridge rectifier or by a power-factor correction stage. Although the EMI filter 120 illustrated in FIG. 1 is positioned between the dc input voltage source 110 and the half-bridge capacitor voltage divider formed by first and second divider capacitors $C_4$, $C_5$, the EMI filter 120 may contain filtering components positioned elsewhere in the power converter.

The transformer $T_1$, coupled to the first and second power switches $Q_1$, $Q_2$, has a primary winding P1, and first and second secondary windings S1, S2 with a turns ratio n:1:1 that is selected to provide an output signal or characteristic (e.g., an output voltage VOUT) with consideration of the range of the input voltage $V_{bus}$ and stress on the power train of the power converter. A resonant full-bridge dc-dc power converter may be formed with two power switches substituted for the first and second divider capacitors $C_4$, $C_5$. Each of the added power switches in a full-bridge configuration would be switched substantially synchronously with a diagonally oriented power switch.

The first and second power switches $Q_1$, $Q_2$ (e.g., n-channel field-effect transistors) are controlled by a controller (or control system) 140 that produces switch control signals (e.g., gate-drive signals HDRV, LDRV) to control the first and second power switches $Q_1$, $Q_2$ to conduct for controlled intervals of time (i.e., for controlled "ON" times). The term "signal" is used herein to represent, without limitation, a physical voltage or current. The first and second power switches $Q_1$, $Q_2$ alternately conduct in response to the gate-drive signals HDRV, LDRV (e.g., gate-drive voltages) produced by the controller 140 with a switching frequency (designated "$f_s$") and a corresponding switching period $T_s=1/f_s$. The ac voltage appearing or present on the first and second secondary windings S1, S2 of the transformer $T_1$ is rectified by first and second diodes $D_1$, $D_2$, and the dc component of the resulting waveform is coupled to the output through the low pass output filter formed with output filter capacitor $C_{out}$ to produce the output voltage VOUT. The controller 140 senses the output voltage VOUT to regulate the ON time of the first and second power switches $Q_1$, $Q_2$. The OFF time of the first and second power switches $Q_1$, $Q_2$ may also be adjusted as a function of a current or a power level of the power converter to reduce power converter losses as described by Jungreis, et al., cited previously hereinabove.

The power converter is operated as a resonant half-bridge topology. The term "resonant" is employed herein to refer to a switch-mode topology employing a resonant tank circuit or resonant circuit formed principally by a resonant capacitor $C_1$ and a resonant inductor $L_{res}$ to produce a current waveform that is a portion of, but may not be a full, sinusoidal waveform. The resonant circuit is series-coupled to the transformer $T_1$. The circuit node between first and second divider capacitors $C_4$, $C_5$ substantially remains at a voltage approximately equal to half of the input voltage $V_{bus}$ with respect to a primary ground, which is identified with the symbol "p." The secondary ground is identified with the symbol "s." The source of second power switch $Q_2$ is coupled to the primary ground p.

The resonant capacitor $C_1$ and the first and second divider capacitors $C_4$, $C_5$ are coupled together at common circuit node $N_0$. The first and second divider capacitors $C_4$, $C_5$ are roughly equal in capacitance and the combination is generally larger in capacitance than that of the resonant capacitor $C_1$. Such a structure provides symmetry from an EMI perspective for high frequency currents fed back to the dc input voltage source 110, and also provides a relatively unvarying voltage at the common circuit node $N_0$. In an alternative embodiment, one or both of the resonant capacitor $C_1$ and the first divider capacitor $C_4$ can be omitted from the power converter. If both the resonant capacitor $C_1$ and the first divider capacitor $C_4$ are omitted from the power converter, the second divider capacitor $C_5$ would be selected with a capacitance similar to that of resonant capacitor $C_1$.

The resonant inductor $L_{res}$ includes the leakage inductance of the transformer $T_1$ referenced to its primary winding P1. The effective resonant capacitance is $C_{eff}$, given by the equation:

$$C_{eff}=C_1 \cdot (C_4+C_5)/(C_1+C_4+C_5).$$

The half period $T_{half}$ of the resonant circuit, which is the period during which a power switch is turned ON, can be represented approximately by the equation:

$$T_{half}=\pi \cdot \sqrt{L_{res} \cdot C_{eff}}$$

If a power switch ON times are approximately equal to the half-period $T_{half}$ shown above, the power converter operates as a "dc transformer" that produces an output voltage VOUT substantially proportional to the input voltage $V_{bus}$. The output-to-input voltage ratio is substantially fixed by the transformer $T_1$ turns ratio when it is operated as a dc transformer, and thus the power converter per se does not provide output voltage regulation if the power switch ON times are approximately equal to the half period $T_{half}$ shown above. Regulation of the output voltage VOUT in such an arrangement can be provided by a pre-converter stage (not shown) that regulates the input voltage $V_{bus}$ to the power converter illustrated in FIG. 1 if a power switch ON times are approximately equal to the half period $T_{half}$ shown above.

Control (e.g., modification, alteration, variation, etc.) of the switching frequency by varying the ON time of the first and second power switches $Q_1$, $Q_2$ can be employed to regulate the output voltage VOUT of the power converter. In an embodiment, the ON time (or conduction periods or a duty cycle) between fixed OFF times of the first and second power switches $Q_1$, $Q_2$ may be varied to control the switching frequency to regulate the output voltage VOUT. The dead times between power switch conduction periods and/or the ON times of the first and second power switches $Q_1$, $Q_2$ may be substantially equal, but are not required to be so.

At a high input voltage level, the power train may be operated at a switching frequency that is higher than the resonant frequency $f_{res}$ of the resonant circuit. At a high input voltage level, the ON time (often referred to or designated as "$T_{on}$") of each of the first and second power switches $Q_1$, $Q_2$ corresponds to an ON time that is equivalent to a frequency that is a higher than the resonant frequency of the resonant circuit. In other words, the ON time for each of the first and second power switches $Q_1$, $Q_2$ is a little shorter than the half period $T_{half}$ of the resonant circuit, and together the first and second power switches $Q_1$, $Q_2$ are ON for a period of time that is a little shorter or less than twice the half period $T_{half}$. The ON times of the first and second power switches $Q_1$, $Q_2$ are preferably, but not necessarily, equal. Thus, the first and second power switches $Q_1$, $Q_2$ are turned OFF before the time that the current in the resonant circuit reaches zero, and the switching period is kept short enough and the dead-time between alternate switch conduction times long enough to assure that, throughout the tolerance band of variations of power converter inductances and capacitances, the current through a controlled switch on a primary side of the power converter will shift to an anti-parallel diode (or body diode) of the power switch that is about to be turned ON (or prior to turning ON the same) or that the resonant current has decayed to approximately zero. The body diodes of the first and second power switches $Q_1$, $Q_2$ are designated $D_{BD1}$, $D_{BD2}$, respectively. Thus, a variable ON time is employable in a power converter such as a resonant bridge power converter to regulate the output voltage VOUT.

In U.S. patent application Ser. No. 12/486,520, entitled "Power Converter Employing a Variable Switching Frequency and a Magnetic Device with a Non-Uniform Gap," to A. Brinlee, et al., filed Jun. 17, 2009, which is incorporated herein by reference, a switching frequency of a power switch of a power converter is controlled as a function of a condition of the power converter representing an output power. Also, a duty cycle of the power switch(es) is controlled to regulate an output characteristic of the power converter such as the output voltage. The ON time of the power switches may be controlled (e.g., slightly modulated) to reduce or cancel a ripple voltage (e.g., a 120 hertz ripple voltage) of an input voltage source such as an upstream power converter (e.g., a power factor correction converter) to the power converter employing the power switches.

Figure 2A:
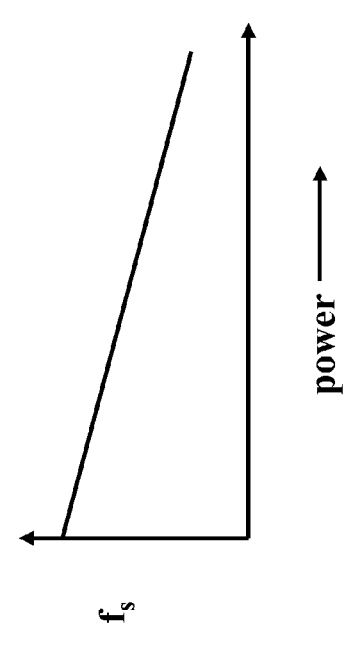
FIGS. 2A and 2B illustrate graphical representations of exemplary performance characteristics of a power converter according to the principles of the present invention.
Figure 2B:
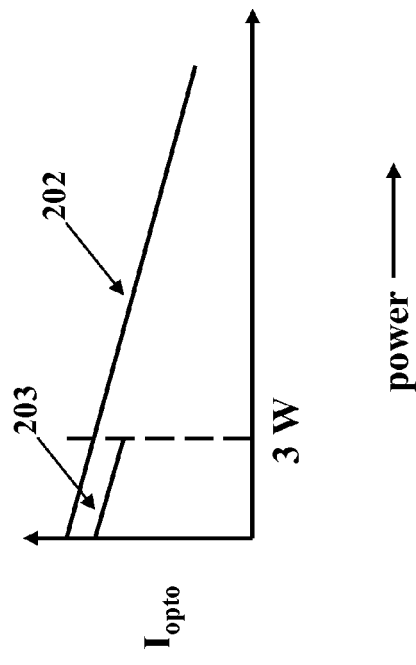

Turning now to FIGS. 2A and 2B, illustrated are graphical representations of exemplary performance characteristics of a power converter according to the principles of the present invention. FIG. 2A illustrates a switching frequency $f_s$ of an LLC power stage as a function of power converter output power. As output power increases, the switching frequency $f_s$ of the power converter decreases. FIG. 2B illustrates an opto-isolator output current $I_{opto}$ in a controller feedback loop for an LLC power stage, represented by the line 202, as a function of power converter output power. When output power falls below a lower power threshold, such as the lower power threshold represented by the vertical dashed line at the power level of three watts ("W"), the power converter may be transitioned to a low power mode, wherein dead time between the ON time(s) of the power switches is increased to reduce power converter losses. When the power converter is operated in such a low power mode, the opto-isolator output current $I_{opto}$ falls somewhat to a lower current level, as represented by the line 203, to preserve regulation of output voltage. Ideally, as introduced herein, to preserve output voltage regulation without an unnecessary transient in the output voltage, the controller executes a corrective action to transition between the lines 202 and 203 when the power converter is transitioned between operation in a normal and a low power mode.

Thus, the OFF times of the power switches (such as the first and second power switches $Q_1$, $Q_2$ illustrated with respect to FIG. 1) may be increased as the load is decreased, such as indicated by a transient increase of the output voltage of the power converter, which causes the switching frequency of the power converter to decrease at light loads. The decrease in switching frequency decreases switching losses. In an alternative design, the ON times of the power switches (such as the first and second power switches $Q_1$, $Q_2$ illustrated with respect to FIG. 1) may be decreased as the load is decreased, which causes the switching frequency of the power converter to increase at light loads. Exemplary dead times are advantageously increased for loads below a chosen load point such as three watts so that the power losses are reduced at low load levels, and conduction and switching-loss trade-offs can be made for the power converter.

The input pins on mixed signal integrated circuits such as an integrated circuit embodying a controller for an LLC power stage typically sense a single analog voltage level entering the integrated circuit, and are limited to an adjustment of one internal level by that analog voltage level through external components. An integrated circuit embodying a controller is generally formed as an application specific integrated circuit ("ASIC"), and will be generally referred to herein as an integrated circuit. Occasionally, there is also a logic function associated with these pins as well, but only a single voltage level sense. Thus, additional pins, which are generally expensive, are conventionally added to an integrated circuit to provide additional voltage inputs for an internal signal.

Figure 3:
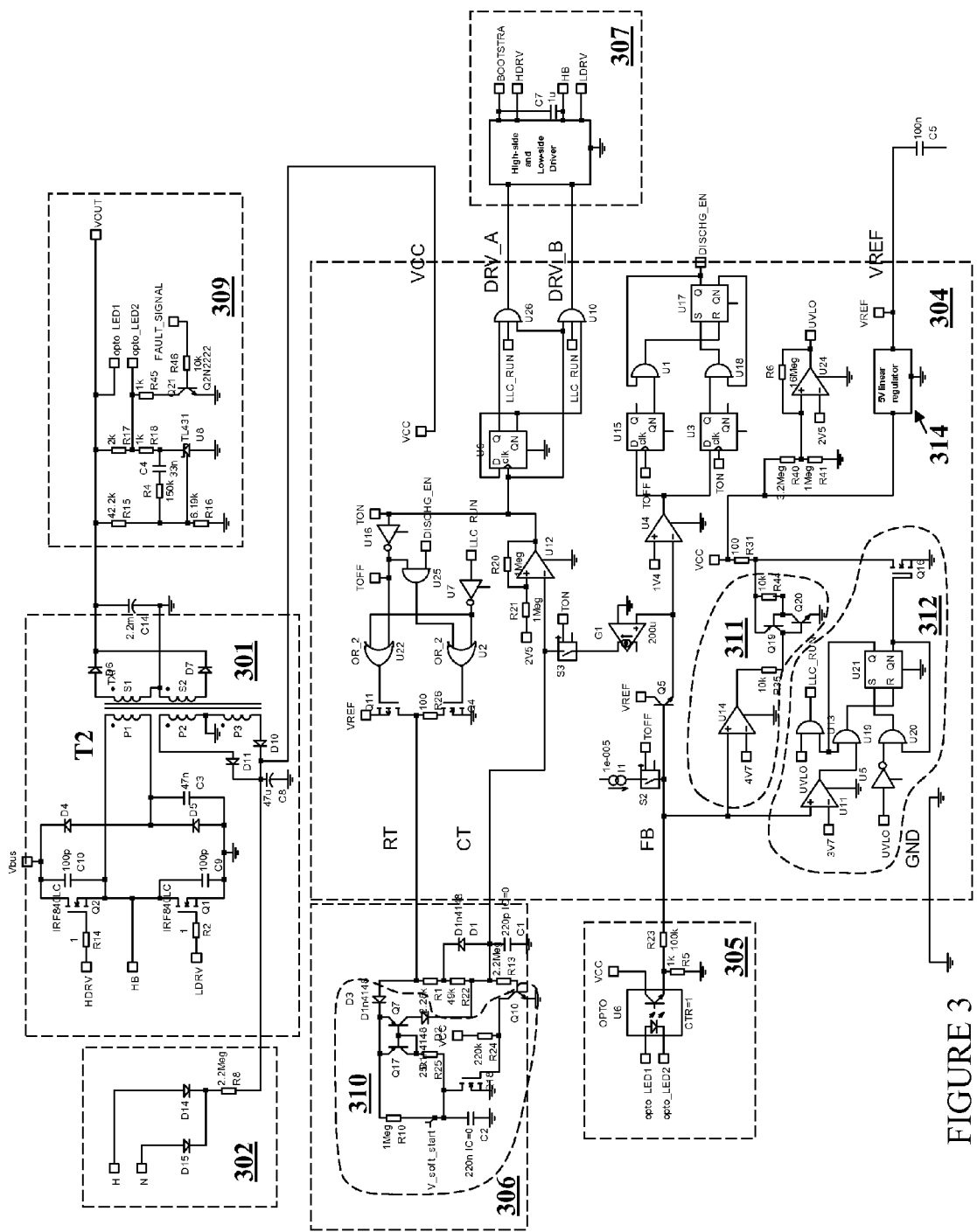
FIG. 3 illustrates a schematic diagram of an embodiment of a power converter including a control system constructed according to the principles of the present invention.

Turning now to FIG. 3, illustrated is a schematic diagram of an embodiment of a power converter including a control system constructed according to the principles of the present invention. The schematic diagram illustrated in FIG. 3 illustrates a control system with portions thereof formed as an integrated circuit for an exemplary variable-frequency LLC power train 301. The schematic diagram illustrated in FIG. 3 includes processes to provide multiple functional uses of a circuit node such as single pin (e.g., a feedback node or pin FB). A controller 304 as described hereinbelow controls an operation of the power trains 301 of the power converter.

The power train 301 is formed with transformer T2 with primary windings P1, P2, P3 and secondary windings S1, S2. A bias startup circuit 302 is coupled to hot and neutral lines H, N, of ac mains to a capacitor C8 through the high resistance of a resistor R8 to provide a startup voltage for a bias voltage source VCC. When the voltage of the bias voltage source VCC is greater than a threshold voltage, such as 16 volts, a comparator U24 produces a signal (an under-voltage lockout "UVLO") that enables power switch control signals DRV_A, DRV_B to be generated by the controller. The power switch control signals DRV_A, DRV_B are coupled to high-side and low-side driver 307 to initiate switching operation of the power train 301. High-side and low-side driver 307 produces gate-drive signals HDRV, LDRV for the power switches Q1, Q2. The switching action of the power train 301 provides an ongoing energy source for the bias voltage source VCC from the primary windings P2, P3. An internal five volt linear regulator 314 coupled to the bias voltage source VCC produces an internal regulated bias voltage source VREF. A capacitor C5 filters high-frequency components from the regulated bias voltage source VREF, and provides stability for the linear regulator 314.

The power converter illustrated in FIG. 3 includes an output voltage sensing circuit 309 that produces signals opto_LED1, opto_LED2 that are coupled to the input of an opto-isolator U6 in opto-isolator circuit 305. The opto-isolator circuit 305 produces a feedback signal at the feedback node FB for the controller 304 to enable regulation of a power converter output signal or characteristic (e.g., an output voltage VOUT). The power converter also includes a resistor-capacitor ("RT") timing circuit 306 with a soft-start circuit 310.

A current produced by a current source I1 (or, in an alternative embodiment, a current sink) is applied within the controller 304 to the feedback node FB to enable multiple functional uses thereof. The amount of current produced by the current source I1 is designed to be low compared with the current that would otherwise flow through any impedances that would typically be connected to that node FB. The current source I1 is switched ON and OFF with a timing signal TOFF inside the controller 304. A timing signal TON produced by a timing clock U12 coupled to the timing circuit 306 is inverted by an inverter U16 to produce the timing signal TOFF. By placing a large-resistance resistor R23 in series with the feedback node FB, two levels of voltage can be selectively obtained at the node FB. These two levels of voltage are a function of both the voltage level that would be present without the current source I1 as well as with the (large) resistance value of the resistor R23 (e.g., 100 kilo-ohms "kΩ") placed in series with the feedback node FB and the current source I1. Two separate resistors (e.g., resistors R5 and R23) external to the controller 304 can accordingly be used to adjust two separate parameters therein using only a single integrated feedback node FB. As an example, the value of the current source I1 is ten microamperes ("μA") when the timing signal TOFF is high and zero amperes when the timing signal TOFF is low. Thus, the voltage appearing on the feedback node FB is equal to the voltage across the resistor R5 when the timing signal TOFF is low and is equal to the voltage across the resistor R5 plus one volt when the timing signal TOFF is high. The voltage differential of one volt can be changed external to the controller by changing the value of the resistor R23.

The feedback node FB thus allows external adjustment of a number of parameters. A circuit (a non-latching shutdown circuit) 312 illustrated in FIG. 3 is configured to produce a non-latching shutdown (e.g., a "hiccup") mode of operation when the voltage of the feedback node FB exceeds about 3.7 volts (a threshold, "3V7") by turning ON a switch Q16, which shorts the bias voltage source VCC to local circuit ground through a resistor R31 (e.g., 100 ohms). A circuit (a latching shutdown circuit) 311 is configured to produce a latching shutdown mode of operation when the voltage of the feedback node FB exceeds 4.7 volts (a threshold, "4V7") by turning ON a pair of switches Q19, Q20, which emulates a thyristor. The pair of switches Q19, Q20 also shorts the bias voltage source VCC to local circuit ground through the resistor R31. Continuing current supplied by the bias startup circuit 302 provides sufficient current to maintain the pair of switches Q19, Q20 in a latched-ON state. Thus, when the voltage on the feedback node FB exceeds 4.7 volts, the power converter will shut down and latch off until the ac mains is removed. After removal of the ac mains, the latched-off state quickly resets since the voltage across the capacitor C8 is very low (equal to the ON-state voltage of the thyristor formed by the pair of switches Q19, Q20) prior to removal of the ac mains, and there is no other substantial source of stored energy in the path that holds the pair of switches Q19, Q20 in the ON state.

The feedback node FB generates a current through a voltage controlled current source G1 that is proportional thereto minus an offset of approximately 1.2 volts produced by an emitter follower Q5 and the base-emitter drop inside the current mirror that is used to create the voltage controlled current source G1. This current, which is a function of the feedback voltage at the feedback node FB, modulates the current into a timing capacitor C1 coupled to a circuit node or pin CT during the ON time of the gate drives (that is, when the timing signal TON is high and the timing signal TOFF is low). The 1.2 voltage offset allows for an external setting of the opto-isolator bias current through the choice of the resistor R5.

Figure 4:
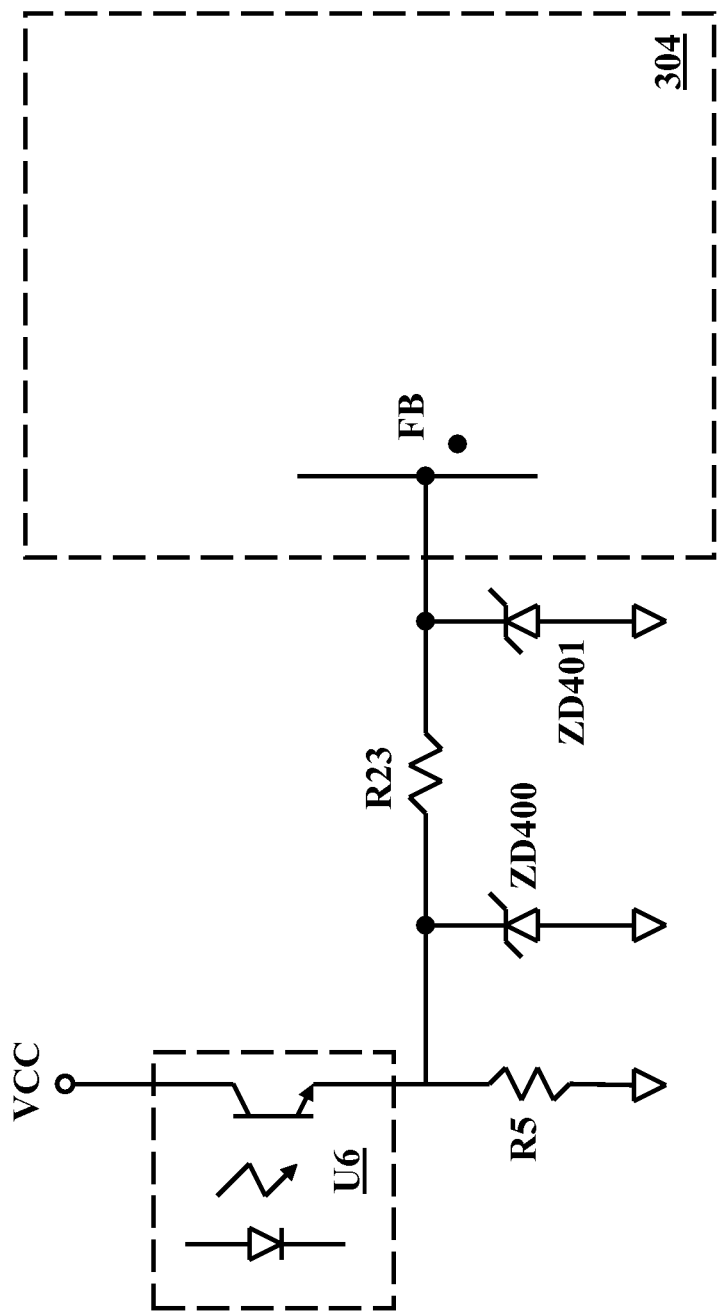
FIGS. 4 and 5 illustrate schematic diagrams of embodiments of opto-isolator circuits employable with the power converter of FIG. 3 constructed according to the principles of the present invention.

Turning now to FIG. 4, illustrated is a schematic diagram of an embodiment of an opto-isolator circuit employable with the power converter of FIG. 3 constructed according to the principles of the present invention. The opto-isolator circuit includes a Zener diode ZD400 across a resistor R5 to limit the frequency range of the LLC power stage. A Zener diode ZD401 represents an alternative Zener diode location to limit the frequency range of the LLC power stage. If the bias voltage source VCC is fixed, the frequency range of the LLC power stage can be limited by placing a resistor between the collector of the opto-isolator circuit and the bias voltage source VCC. In cases where a regulated bias voltage source VREF is brought out external to the controller, the collector of the opto-isolator U6 may be coupled to the regulated bias voltage source VREF rather than to the bias voltage source VCC. Limiting the frequency range in either of these ways prevents the opto-isolator U6 from activating either type of fault. Fault handling in the controller would then employ a separate opto-isolator.

Returning to FIG. 3, an internal comparator U4 transitions the controller 304 into a low power mode of operation when the feedback voltage exceeds approximately 2.1 volts [a threshold based on 1.4 V+VBE_Q5]. The low power mode of operation disables the timing of a switch Q4 on the RT pin and causes the OFF time of the gate drives to become very large as determined by an external resistor R13 in the timing circuit 306. The feedback level at which the controller comes out of its low power mode is determined by the 2.1 volt threshold described above as well an offset produced by the external resistor R23 placed in series with the feedback node or pin FB in the opto-isolator circuit 305.

The current source I1 that may be formed with a current mirror and a resistor in a conventional manner and controlled by the timing signal TOFF injects a square wave of current into the feedback node FB. An exemplary injected current amplitude would be approximately ten microamperes, which produces a square-wave offset voltage of about the same. Since the resistance of the resistor R5 (e.g., one kilo-ohm "kΩ") is typically much lower than the resistance of resistor R23 (e.g., 100 kilo-ohms) the effect of the ten microampere injected current on the voltage across the resistor R5 is negligible. The current source I1 that produces the current is turned off by a switch S2 during the ON time of the gate drives. What results is a superimposed square wave voltage at the feedback node FB of the controller 304. The superimposed square wave voltage has an amplitude equal to the product of the current amplitude of the switching current source and the external resistor R23 in series with the feedback node FB. In this case, the amplitude of the superimposed square wave voltage would be approximately one volt [(10 µA)×·(100 kΩ)=1 volt].

Logic coupled to the comparator U4 for the controller 304 transitions the same into a low power mode when the feedback voltage at the opto-isolator emitter rises above 2.1 volts, but gates the controller 304 out of the low power mode after the feedback voltage at the opto-isolator emitter falls below about 1.1 volts. The one volt hysteresis band is settable by changing the resistance value of the external resistor R23.

The process to make multifunctional use of the feedback node FB advantageously includes turning a low value current source (or sink) ON and OFF in synchronization with a clock oscillator and injecting the current produced by the current source I1 into a circuit node such as the feedback node FB that is used to sense a voltage. The gating of a condition within the controller 304 is also timed to coincide with the gating of the current source I1 so that a band of hysteresis is created that can be externally set with a single resistance value (e.g., the resistance of resistor R23). The process thus allows for an increase in the number of externally settable parameters for the controller 304 without increasing a pin count. The process can also be used to increase the number of sensed parameters to three rather than two by using both a current source and a current sink that are turned ON and OFF in synchronization with the controller 304.

A signal LLC_RUN that is an enabling signal for the overall operation of the power converter is produced by logic U13. This signal LLC_RUN is generally produced by logic U3 that is tailored for a particular power converter design, and will not be further described herein in the interest of brevity. In addition, internal reference voltages such as "4V7," "3V7," etc., representing voltage sources with respective voltages of 4.7 volts, 3.7 volts, etc., are conventionally produced by small internal dissipative regulators and/or voltage dividers coupled to the bias voltage sources VCC, VREF, and will also not be further described herein in the interest of brevity.

Figure 5:
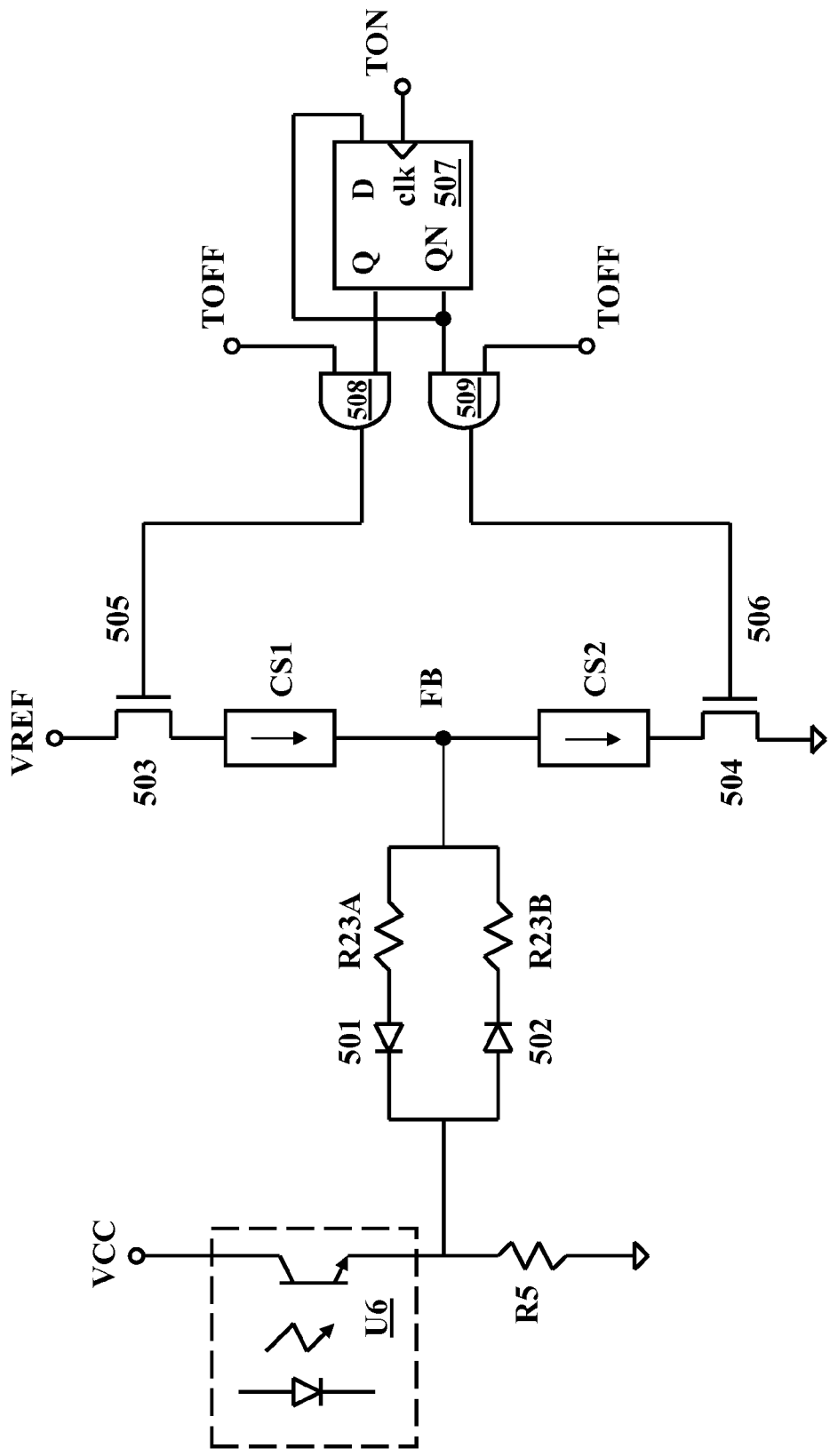

Turning now to FIG. 5, illustrated is a schematic diagram of an embodiment of an opto-isolator circuit employable with the power converter of FIG. 3 constructed according to the principles of the present invention. A current source CS1 and a current sink CS2 are turned ON and OFF by switches 503, 504 in synchronization with a timing signal TON, which is the inverse of the timing signal TOFF. To increase the number of sense parameters beyond that illustrated in FIG. 3, a delay flip-flop 507 is coupled to the timing signal TON to produce signals 505, 506 employing AND gates 508, 509 to switch between current source CS1 and current sink CS2 based on the state of the delay flip-flop 507. For example, a one microampere current may be injected from the current source CS1 into the feedback node FB at one time, no current at another time, and then sink a one microampere current into the current source CS2 at a third time. Using diodes 501, 502 in series with external resistors R23A, R23B, the combination of which is in series with the feedback node FB would thus lead to a third signal level. Of course, ones of the diodes (e.g., diode 502) may be omitted.

Returning again to FIG. 3, the process does not have to be used to change the state of the controller 304 (for example from standard operation to low power mode). The process can also be used for other purposes such as to read voltage levels for analog purposes (e.g., such as for charging an external capacitor in a given amount of time). This example of multiple functional use of the feedback node FB could also be employed to set a time limit (or integrated power limit) for short-term over-current protection, for example, in printer power supplies, without using an additional integrated circuit node or pin.

Thus, a controller 304 has been introduced that may be formed as an integrated circuit for a power converter. The power converter may be constructed as an LLC power stage. The controller 304 is constructed with a feedback node FB configured to alter a gate drive signal [HDRV or LDRV] for a power switch [Q2 or Q1] in the power converter. A current source I1 in the controller 304 is coupled to the feedback node FB. The current source I1 may be selectively turned ON in synchronization by a timing signal (a clock signal) TOFF in the controller 304 (to produce a square-wave voltage at the feedback node FB). A resistor R23 is coupled between the feedback node FB and a feedback control signal [such as the feedback current control signal produced by opto-isolator U6]. Also, a comparator U4 is coupled to the feedback node FB. The comparator U4 is configured to produce a signal to control a function of the power converter in response to a voltage produced at the feedback node FB by the selectively enabled current source I1. The selectively enabled current source I1 may alter the feedback control signal to accommodate a low power mode of the power converter. The selectively enabled current source I1 creates a hysteresis band to prevent oscillating between the low power mode and a standard power mode of the power converter.

The controller 304 may further include a comparator [U11 or U14] as part of one of the circuits 311, 312 configured to transition the controller 304 to another operational mode of the power converter, such as a latching or non-latching shutdown mode, in response to the voltage produced at the feedback node FB by the current source I1. The comparator may be employed in addition to or in lieu of the selectively enabled current source I1. A Zener diode (e.g., ZD400) may be coupled to the feedback control signal to provide a limit for an operational characteristic of the controller 304 such as a switching frequency.

The controller may further include another current source that is selectively turned ON in synchronization with the timing signal TOFF and another comparator configured to control another function of the power converter in response to a voltage produced at the feedback node FB by the another selectively enabled current source. The another selectively enabled current source may be selectively turned ON in synchronization with a sub-multiple of the timing signal TOFF such as a sub-multiple clock signal produced by a T (toggle) flip-flop coupled to the timing signal TOFF.

Additional pins are also conventionally added to a controller formed as an integrated circuit to enable additional parameters to be set related to timing conduction of power switches. Typically, an oscillator function of the controller is formed with a charge/discharge source connected to an external resistor and capacitor. A sense node or pin is coupled to the external capacitor that senses the voltage on the external capacitor, and another pin is employed to provide another coupling to the external resistor. This allows a single controller parameter to be set through external components. As introduced herein, two changes are made to a conventional circuit to enable several parameters to be externally set for the controller using the same two pins. The first change involves enabling a charge/discharge pin also go to a tri-state value during certain modes of operation of the controller. The term tri-state refers to a circuit condition wherein a signal line is open circuited, and pulled neither high nor low. The second change involves gating the information from the feedback control node or pin FB, a third pin, to draw current through the external timing capacitor C1 during a charge or discharge cycle, but preferably not both.

As previously described hereinabove, FIG. 3 illustrates an example of a controller 304 that may be formed as an integrated circuit and an external circuit connected thereto. The controller 304 produces switch control signals DRV_A, DRB_B coupled to a high-side and low-side driver 307 for a variable-frequency LLC power stage 301. An oscillator section of the controller 304 that produces the timing signals TON, TOFF is coupled to two nodes (or pins) labeled RT and CT as illustrated in FIG. 3. The pin labeled CT monitors voltage across the timing capacitor C1 while the pin RT causes a charge/discharge of the timing capacitor C1 by going high, low, or tri-state. The external timing network includes the timing capacitor C1, timing resistors R1, R22, R13, and diode D1. The soft-start circuit 310 is also included in the timing circuit 306.

When a voltage on the pin RT is high, the timing capacitor C1 charges through series-coupled resistors (charge/discharge resistors) R1, R22. Due to the presence of the diode D1, when the voltage on the pin RT is low, the timing capacitor C1 discharges through the resistor R1. The resistor R22 has negligible effect. When the circuit coupled to the pin RT is tri-state (e.g., when the switches Q4, Q11 are both disabled to conduct), the timing capacitor C1 slowly discharges through resistor R13. While the resistor R13 is always in the circuit regardless of the state of the circuit coupled to the pin RT, in practice, the resistor R13 has negligible effect when the circuit coupled to the pin RT is not tri-state since the resistances of resistors R1, R22 are significantly smaller than the resistance of resistor R13. Furthermore, the voltage of the feedback node FB is translated to a current inside the controller 304 by voltage controlled current source G1. This current increases the charging rate of the timing capacitor C1 to change the ON time of the switch control signals (or gate drive signals). The switch S3 shuts off the current source G1 (which is increasing the charging rate) during the discharge of the timing capacitor C1 (corresponding to the OFF time (or dead-time) of the gate drive signals). The voltage on the feedback node FB, therefore, only affects the ON time of the power switches Q1, Q2, not the OFF time.

When the voltage of the feedback node FB exceeds a predetermined threshold (about 2.1 volts for the power converter illustrated in FIG. 3), the controller 304 switches into a low power mode. In the low power mode, the circuit coupled to the pin RT is tri-stated during the OFF time of the power switches Q1, Q2. The length of the OFF time is determined by the resistance of resistor R13, and is significantly longer than the OFF time that would normally be used. For example, during normal operation, one might have the timing signal TOFF=800 nanoseconds ("ns") and the timing signal TON might vary from four microseconds ("μs") to 12 μs as the load varies. During the low power mode, the OFF time might be changed to one millisecond ("ms"). As described by Jungreis, et al. cited above, changing the OFF time to on the order of one millisecond reduces losses at very low power levels.

Accordingly, the normal operation ON time, normal operation OFF time, and low power OFF time can be set with external resistors using two integrated circuit nodes or pins RT, CT. Furthermore, since the feedback voltage threshold for transitioning to a low power mode is fixed internal to the controller 304 and corresponds to a fixed level of timing current being supplied to the external timing capacitor C1, the gate drive ON time at which the controller 304 enters low power mode can be changed by adjusting the value of the timing capacitor C1. The ability to externally set the OFF time is important since it allows tuning a resonant tank to have substantially zero-voltage switching regardless of a transformer leakage inductance.

It is also noted that pulling the CT pin up to a voltage between 2.5 and five volts and holding it at a voltage level puts the timing into the OFF time and effectively disables the gate drive signals, thus allowing a separate control mechanism for disabling the output of the power converter. Pulling the CT pin to local circuit ground will also disable the power converter as well as reset the soft-start circuit; however, when pulling the CT pin to local circuit ground, one of the gate drive signals will be kept high. Thus, a process and method are introduced to design an integrated circuit for a controller 304 so that multiple (e.g., four) parameters can be adjusted with two timing pins on the integrated circuit such as the ON time, OFF time, low power OFF time, and low power threshold voltage. One of the timing pins can also be used for an output gate drive disable function.

Thus, a controller 304 has been introduced that may be formed as an integrated circuit for a power converter (e.g., a power converter constructed with an LLC power stage). The controller 304 is constructed with two nodes or pins, a first node CT and a second node RT. A capacitor C1 is coupled to the first node CT. A comparator U12 is also coupled to the first node CT, and the comparator U12 is configured to control a power switch of the power converter. The second node RT is coupled to the first node CT through a resistor-diode network (a timing circuit 306). A first switch Q11 is coupled to the second timing node RT. The first switch Q11 is configured to couple the second node RT to a bias voltage source, and the second node RT is configured to charge the timing capacitor C1 through a resistor R22 in the timing circuit 306 when the second node RT is coupled to the bias voltage source by the first switch Q11. A second switch Q4 is also coupled to the second node RT. The second switch Q4 is configured to couple the second node RT to a second voltage level, local circuit ground. The second node RT is configured to discharge the capacitor C1 through a resistance R1 in the timing circuit 306 when the second node RT is coupled to the second voltage level by the second switch Q4.

If the bias voltage source is brought out of the controller 304 (i.e., if the bias voltage source is duplicated external thereto through a linear regulator) one can flip the resistor-capacitor-diode network shown in the timing circuit 306 as well as flip the logic. In the power converter illustrated in FIG. 3, the second node RT is raised to five volts to charge the timing capacitor C1 when the timing signal TON is enabled. Pulling the second node RT to zero volts discharges the timing capacitor C1 when the timing signal TOFF is enabled. In tri-state, the large resistance resistor R13 discharges the timing capacitor C1 to local circuit ground. Since local circuit ground is generally available, this is a convenient arrangement to allow slow capacitor discharge in the tri-state.

If the logic is flipped, then the second node RT would be dropped to zero volts to discharge the timing capacitor C1, corresponding to when the timing signal TON is enabled. The second node RT being raised to five volts would charge the timing capacitor C1, corresponding to when the timing signal TOFF is enabled. A disadvantage with this direction of the charge/discharge of the timing capacitor C1 is that a tri-state does not allow a slow discharge of the timing capacitor C1 unless the resistor R13 is connected to five volts rather than to local circuit ground. The resistor R13 cannot be connected to five volts unless either the bias voltage source is externally available on the integrated circuit, or another five voltage supply is created such as by using a five voltage Zener diode or a linear regulator after the bias voltage source.

The controller 304 is further constructed to operate the first and second switches Q11, Q4 coupled to the first node CT in a tri-state mode in response to an internal signal, wherein the first switch Q11 and the second switch Q4 are both disabled to conduct, enabling the timing capacitor C1 to be discharged through a third resistance R13. The internal signal is generated by a comparator [U11 or U14] sensing a voltage produced by a feedback control signal coupled to a feedback node or pin FB exceeding a threshold voltage level to signal the controller 304 to operate in a low power mode. A Zener diode ZD400 may be coupled to the feedback control signal to provide a limit for an operational characteristic of the controller 304, such as a switching frequency. Ac-dc power supplies typical require the secondary side of the circuit to transmit fault information (e.g., overvoltage protection "OVP" and overcurrent protection "OCP" signals) to a controller to latch off the operation of the power converter or to initiate an auto-restart mode. Transmitting fault information across the primary-secondary isolation boundary usually entails adding a second opto-isolator in addition to a first opto-isolator used for the feedback signal. Adding a second opto-isolator to the design of a controller takes up additional space and cost.

The integrated circuit for the controller 304 is generally formed with comparators coupled to a feedback node or pin FB. When a voltage of the feedback node FB exceeds a level expected in a normal feedback range, it trips fault logic in the integrated circuit. There are two levels for comparison beyond that of the normal feedback range. The lower level initiates a non-latching fault, wherein the operation of the power converter is restarted when the voltage of the feedback node FB falls below the lower level, and a "wait" time has expired. The higher level initiates a latching fault that generally requires removal of input power to the power converter for a sufficient period of time to reset.

As mentioned above, FIG. 3 illustrates an example of an integrated circuit formed with an opto-isolator circuit 305 employed to transmit a feedback signal across the primary-secondary isolation boundary. The controller 304 produces gate drive signals HDRV, LDRV for the variable-frequency LLC power train 301. The feedback signal from the output of the opto-isolator circuit 305 is coupled to the feedback node FB. The feedback node FB can generate a response to two types of fault shutdowns. When the voltage on the feedback node FB exceeds approximately 3.7 volts, the output of comparator U11 goes high, which initiates a hiccup mode (i.e., a non-latching fault mode). In the hiccup mode, the gate drives are disabled and at the same time, switch Q16 turns ON, drawing down the bias voltage source VCC. After the fault signal goes away as indicated by the feedback voltage dropping below 3.7 volts, and after the bias voltage source VCC goes low enough to trigger an undervoltage lockout ("UVLO"), the switch Q16 is turned off, thus allowing the external high-voltage current source (or resistor) to recharge the bias voltage source VCC. The hysteresis designed into the UVLO (e.g., the controller 304 turns ON at 16 volts but operates down to ten volts) will cause a substantial delay for the controller 304 to turn back ON after the fault is cleared. If the fault condition continues to reappear after the gate drive signals HDRV, LDRV are enabled, the gate drive signals HDRV, LDRV will stay ON for a short time followed by a long period of being OFF, which is often referred to as a hiccup mode. As soon as the fault is cleared, the power converter automatically restarts, since this is a non-latching fault.

The feedback node FB is responsive to a second type of fault shutdown. If the voltage of the feedback node FB exceeds 4.7 volts, a thyristor formed by the pair of switches Q19, Q20 draw down the voltage of the bias voltage source VCC and continue to hold the voltage of the bias voltage source VCC down while there is any current flowing thereto, which can be sourced by the bias startup circuit 302. The non-latching fault input already described disables the gate drive signals HDRV, LDRV while the fault on the feedback node FB exceeds 3.7 volts. Thus, when the voltage at the feedback node FB exceeds 4.7 volts, the gate drive signals HDRV, LDRV are disabled and the thyristor formed by the pair of switches Q19, Q20 will turn ON, holding down the voltage of the bias voltage source VCC.

In the case of the non-latching fault, the switch Q11 draws down the voltage of the bias voltage source VCC until the UVLO signal goes low. In contrast, during a latching fault, the thyristor draws down the voltage of the bias voltage source VCC as long as there is any holding current in the thyristor. The bias startup circuit 302 that is designed to provide startup power to the controller 304 provides the holding current for the thyristor. If the bias voltage source VCC is connected to a rectified input line via a high-voltage current source or by a resistor, the controller 304 will remain latched off until the power converter is disconnected from the ac mains for a sufficient period of time (e.g., to discharge the capacitor C8), and is then reconnected.

In order to use the latching or non-latching fault capability of the controller 304, the secondary-side fault output is connected to a switch (switch Q21 in FIG. 3) and series resistor R45 to draw a large amount of current through the opto-isolator circuit 305. The high level of current through the opto-isolator circuit 305 causes the feedback node FB to rise to a sufficiently high voltage to trip the fault circuitry inside the controller 304 as described above. If the voltage of the feedback node FB is allowed to rise to any value, then the latching fault will be initiated when there is a fault. If a Zener diode (e.g., 4.2 volt Zener diode) is placed across the feedback node FB, then the feedback pin will be unable to exceed the 4.7 volt threshold of the latching fault and, therefore, only a non-latching fault can be initiated.

The opto-isolator circuit 305 that is already used to provide a feedback signal to the feedback node FB to regulate an output signal or characteristic of the power converter such as the output voltage VOUT can therefore also be used to provide latching or non-latching fault capability for the power converter. Whether the fault is latching or non-latching can be set externally by the presence or absence of a Zener diode on the feedback node FB.

Thus, a controller 304 has been introduced that may be formed as an integrated circuit for a power converter. The controller 304 is constructed with a feedback node FB configured to receive a feedback control signal from an opto-isolator circuit 305 to produce a control signal for a power switch in the power converter. The power converter may be constructed, without limitation, as an LLC power stage or a pulse-width modulated ("PWM") power converter. A comparator U11 is coupled to the feedback node FB, and the comparator U11 is configured to enable a first mode of operation for the power converter (e.g., a non-latching shutdown mode) when a voltage to the comparator U11 produced at the feedback node FB exceeds a first threshold voltage. A selectively switched current source, resistor R45, switch Q21, may be coupled to the opto-isolator circuit 305, and the selectively switched current source may be employed to selectively produce a level of current in the opto-isolator circuit 305 sufficient to trip the comparator U11. The controller 304 further includes a comparator U14 coupled to the feedback node FB, and the comparator U14 is configured to enable a second mode of operation for the power converter (e.g., a latching shutdown mode), when a voltage to the comparator U14 produced at the feedback node FB exceeds a second threshold voltage.

A Zener diode ZD400 may be coupled to the feedback control signal to prevent the voltage to the comparator U14 produced at the feedback node FB from exceeding the second threshold voltage. A Zener diode ZD401 may be placed directly across the feedback node FB to prevent the voltage to the comparator U14 produced at the feedback node FB from exceeding the second threshold voltage. Inclusion of the Zener diode prevents the comparator from enabling the second mode of operation.

Those skilled in the art should understand that the previously described embodiments of a power converter including circuits to make multiple functional use of a circuit node or pin and related methods of operating the same are submitted for illustrative purposes only. While a power converter including circuits to make multiple functional use of a circuit node or pin has been described in the environment of a power converter, these processes may also be applied to other systems such as, without limitation, a bias supply, a power amplifier, or a motor controller. Additionally, it should be understood that separations in circuit functions are provided only for the purposes of description, and selected circuits may be combined into an integrated controller and still fall within the broad scope of the present invention. For the purposes of the discussion herein, a control system may include, without limitation, a controller, opto-isolator circuit, timing circuit, bias startup circuit, output voltage sensing circuit and a driver. In short, any circuit that assists in the management or control of a power train of a power converter may be incorporated into a controller or control system.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A control system, comprising:
   an opto-isolator circuit, including a first resistor coupled to an opto-isolator of said opto-isolator circuit and a second resistor coupled between said first resistor and a feedback node of said control system, said opto-isolator circuit configured to receive an output signal from a power converter and provide a feedback signal to said feedback node to provide a switch control signal for a power switch of said power converter; and
   a current source configured to produce a current through said second resistor to provide multiple voltage levels at said feedback node, thereby enabling multiple functional uses of said feedback node.

2. The control system as recited in claim 1 further comprising a timing circuit configured to provide timing signals to said current source as a function of a timing capacitor at a node and a charge/discharge resistor at another node.

3. The control system as recited in claim 1 further comprising a current sink configured to produce said multiple voltage levels at said feedback node in accordance with said current source and said second resistor with a series-coupled diode.

4. The control system as recited in claim 1 wherein said opto-isolator circuit includes a Zener diode across said first resistor configured to limit a frequency range for said power converter.

5. The control system as recited in claim 1 further comprising a voltage controlled current source configured to modulate a current of a timing capacitor as a function of said multiple voltage levels at said feedback node.

6. The control system as recited in claim 1 further comprising a comparator configured to enable a low power mode of operation for said power converter when a voltage level at said feedback node is above a threshold.

7. The control system as recited in claim 1 further comprising a circuit configured to enable a hiccup mode of operation for said power converter when a voltage level at said feedback node is above a threshold.

8. The control system as recited in claim 1 further comprising a circuit configured to enable a latching shutdown mode of operation for said power converter when a voltage level at said feedback node is above a threshold.

9. The control system as recited in claim 1 wherein portions of said control system are formed as an integrated circuit and said feedback node is a pin thereof.

10. A method, comprising:
    receiving an output signal from a power converter including a control system with an opto-isolator circuit, said opto-isolator circuit including a first resistor coupled to an opto-isolator of said opto-isolator circuit and a second resistor coupled between said first resistor and a feedback node of said control system;
    providing a feedback signal to said feedback node to provide a switch control signal for a power switch of said power converter; and
    producing a current through said second resistor with a current source to provide multiple voltage levels at said feedback node, thereby enabling multiple functional uses of said feedback node.

11. The method as recited in claim 10 further comprising limiting a frequency range for said power converter.

12. The method as recited in claim 10 further comprising enabling one of a low power mode of operation, a hiccup mode of operation and a latching shutdown mode of operation for said power converter when a voltage level at said feedback node is above a threshold.

13. A power converter, comprising:
    a power train including at least one power switch; and
    a control system, including:
    an opto-isolator circuit, including a first resistor coupled to an opto-isolator of said opto-isolator circuit and a second resistor coupled between said first resistor and a feedback node of said control system, said opto-isolator circuit configured to receive an output signal from a power converter and provide a feedback signal to said feedback node to provide a switch control signal for said at least one power switch, and a current source configured to produce a current through said second resistor to provide multiple voltage levels at said feedback node, thereby enabling multiple functional uses of said feedback node.

14. The power converter as recited in claim 13 wherein said control system further comprises a timing circuit configured to provide timing signals to said current source as a function of a timing capacitor at a node and a charge/discharge resistor at another node.

15. The power converter as recited in claim 13 wherein said control system further comprises a current sink configured to produce said multiple voltage levels at said feedback node in accordance with said current source and said second resistor with a series-coupled diode.

16. The power converter as recited in claim 13 wherein said opto-isolator circuit includes a Zener diode across said first resistor configured to limit a frequency range for said power converter.

17. The power converter as recited in claim 13 wherein said control system further comprises a voltage controlled current source configured to modulate a current of a timing capacitor as a function of said multiple voltage levels at said feedback node.

18. The power converter as recited in claim 13 wherein said control system further comprises a comparator configured to enable a low power mode of operation for said power converter when a voltage level at said feedback node is above a threshold.

19. The power converter as recited in claim 13 wherein said control system further comprises a circuit configured to enable a hiccup mode of operation for said power converter when a voltage level at said feedback node is above a threshold.

20. The power converter as recited in claim 13 wherein said control system further comprises a circuit configured to enable a latching shutdown mode of operation for said power converter when a voltage level at said feedback node is above a threshold.

* * * * *